United States Patent [19]
Woffinden

[11] Patent Number: 4,757,447
[45] Date of Patent: Jul. 12, 1988

[54] VIRTUAL MEMORY SYSTEM HAVING IDENTITY MARKING FOR COMMON ADDRESS SPACE

[75] Inventor: Gary A. Woffinden, Scotts Valley, Calif.

[73] Assignee: Amdahl Corporation, Sunnyvale, Calif.

[21] Appl. No.: 93,135

[22] Filed: Sep. 3, 1987

Related U.S. Application Data

[63] Continuation of Ser. No. 889,602, Jul. 28, 1986, abandoned, which is a continuation of Ser. No. 555,857, Nov. 28, 1983, abandoned.

[51] Int. Cl.⁴ .................. G06F 12/08; G06F 12/10
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,825,904 | 7/1974 | Burk et al. | 364/200 |
| 3,902,164 | 8/1975 | Kelley | 364/200 |
| 4,053,948 | 10/1977 | Graves | 364/200 |
| 4,077,059 | 2/1978 | Cordi et al. | 364/200 |
| 4,079,453 | 3/1978 | Dahl | 364/200 |
| 4,280,177 | 7/1981 | Schorr et al. | 364/200 |
| 4,298,929 | 11/1981 | Capozzi | 364/200 |
| 4,323,968 | 4/1982 | Capozzi | 364/200 |
| 4,464,712 | 8/1984 | Fletcher | 364/200 |

OTHER PUBLICATIONS

Hogan, "Extended Translation Look-Aside Buffer", IBM Technical Disclosure Bulletin, vol. 19, #2, Jul. 1976, pp. 597-598.

*Primary Examiner*—David Y. Eng
*Attorney, Agent, or Firm*—Fliesler, Dubb, Meyer & Lovejoy

[57] ABSTRACT

A data storage system includes a translation buffer for translating virtual page addresses to system page addresses, a data cache in which the data is identified by virtual address, and a mainstore in which data is stored by system address. When a new translation buffer entry is made which replaces an old translation buffer entry and both the old and the new translation buffer entries translate to the same system page address, then all data residing in the data cache identified by the virtual page address of the old translation buffer entry is allowed to match the virtual page address of the new translation buffer entry, and need not be evicted. This provides efficient handling of synonymous virtual addresses.

8 Claims, 2 Drawing Sheets

FIG.−1

VIRTUAL MEMORY SYSTEM HAVING IDENTITY MARKING FOR COMMON ADDRESS SPACE

This is a continuation of application Ser. No. 889,602, filed July 28, 1986, now abandoned, which is a continuation of application Ser. No. 555,857, filed Nov. 28, 1983, now abandoned.

CROSS-REFERENCES

APPARATUS FOR REVERSE TRANSLATION, Ser. No. 527,674, Filed: Aug. 29, 1983 now U.S. Pat. No. 4,631,660.

TRANSLATION LOOKASIDE BUFFER POINTER, Ser. No. 528,094, Filed: Aug. 29, 1983 now U.S. Pat. No. 4,682,281.

APPARATUS FOR REVERSE TRANSLATION, Ser. No. 528,091, Filed: Aug. 29, 1983 now U.S. Pat. No. 4,551,797.

TIME SHARED TRANSLATION BUFFER, Ser. No. 530,768, Filed: Sept. 7, 1983 now abandoned.

VIRTUALLY ADDRESSED CACHE, Ser. No. 527,678, Filed: Aug. 29, 1983 now U.S. Pat. No. 4,612,612.

EVICTION CONTROL APPARATUS, Ser. No. 527,676, Filed: Aug. 29, 1983 now abandoned.

MEMORY SYSTEM, Ser. No. 528,093, Filed: Aug. 29, 1983 now abandoned.

BACKGROUND OF THE INVENTION

The present invention relates to the field of instruction controlled digital computers and specifically to methods and apparatus associated with virtual and real addressing in data processing systems.

It is common in data processing systems to have a memory hierarchy wherein buffer memories of relatively low capacity, but of relatively high speed, operate in cooperation with main memories of relatively high capacity but of relatively low speed. It is desired that the vast majority of accesses, either to fetch or store information, be from the buffer memory so that the overall access time of the system is enhanced. In order to have the vast majority of accesses come from the relatively fast buffer memory, information is exchanged between the main memory and the buffer memory in accordance with predetermined algorithms.

The efficiency with which a buffer memory works in decreasing the access time of the overall system is dependent on a number of variables. For example, the variables include the capacity of the buffer memory, the capacity of the main store, the data transfer rate between stores, the replacement algorithms which determine when transfers between the main store and buffer are made, and the virtual-to-real address translation methods and apparatus.

Recent data processing systems have been designed with virtual storage in which different user programs are operable in the system. The programs identify storage locations with virtual addresses. The virtual addresses are translated dynamically to system addresses during the processing of instructions. Dynamic address translation is particularly important in multi-programming environments since different programs are free to use the same virtual addresses. To avoid interference, the system must translate virtual addresses, which are not unique, to system addresses which are unique for each executing program.

Each virtual address space typically has a virtual address space descriptor which identifies the transform tables which are to be utilized in tranforming the virtual address to a system address.

The transformation process for transforming logical addresses to system addresses is time consuming process, particularly for virtual addresses which typically have translation tables stored in main store.

In order to speed up the translation process, translation lookaside buffers have been employed. In such translation buffers, the translation information resulting from a translation of a logical address to a system address are saved once the translation has been made. When an access to the same location is desired and the translation information is already stored in the translation buffer, time is saved since the re-translation from the logical address to the system address is not required to be made.

When a translation has been made for a virtual address, the translation information is stored in the translation buffer. Thereafter when the same translation information is required, it is accessed directly from the translation buffer.

In a virtual address system for example as described in the cross-referenced applications including a translation buffer, an eviction process is carried out to delete data from the data buffer whenever translation information associated with the data is deleted from the translation buffer. The eviction process provides unwanted overhead.

Also, when a new page or other block of data is to be fetched from main store and stored into the data buffer, the process of fetching the data from main store and storing the data into the buffer is time-consuming and also is to be avoided if possible. The general processes of eviction and of fetching and storing new data into the data buffer are described in the above-identified cross-referenced applications. The overhead penalties resulting from the use of a translation buffer can be significant.

When the translation information for one virtual address replaces the translation information for another virtual address in the translation buffer, the unwanted overhead penalties, including those described above, occur.

In many operating systems a significant portion of the virtual address space is common to one or more other virtual address spaces. That is, the same system address may be specified by two or more different virtual addresses. The result is each of these different virtual addresses specify the same data locations, but because different virtual addresses or different virtual address space descriptors are employed to identify the data, the overhead penalties occur. It is desirable to avoid these overhead penalties when possible.

Accordingly, there is a need for improved memory apparatus which reduces the overhead associated with different virtual addresses which transform to the same system address.

In view of the above background, there is a need for new and improved mechanisms which are particularly useful in systems using virtual addressing.

SUMMARY OF THE INVENTION

The present invention is a virtual address system including a translation buffer. Means are provided for recognizing when first and second virtual addresses, when transformed, specify the same system address.

Under this condition, the overhead associated with fetching data for one of the virtual addresses to replace data associated with the other of the virtual addresses is avoided since the data for both virtual addresses is the same. Data already in the data buffer is not replaced with same data.

As summarized, the present invention provides an improved memory apparatus which avoids unnecessary overhead whenever two or more virtual addresses are transformed to the same system address.

Additional objects and features of the invention will appear from the following description in which the preferred embodiments of the invention have been set forth in detail in conjunction with the drawings.

DETAILED DESCRIPTION

Figure 1:
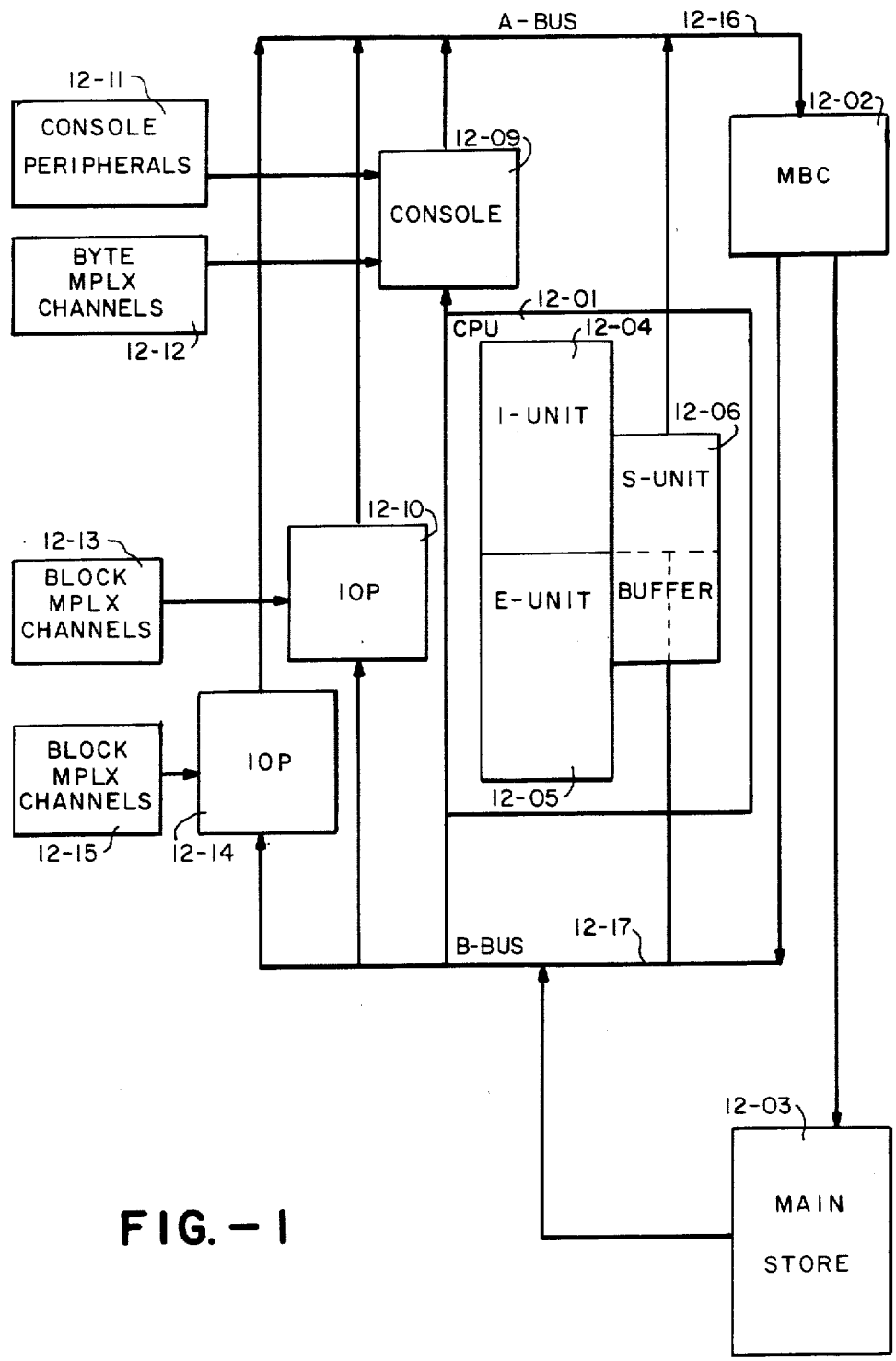
FIG. 1 depicts a block diagram of a system which includes a virtual memory apparatus in accordance with the present invention.

Overall System—FIG. 1

FIG. 1 shows a block diagram of a data processing system. Further details of the system are described in the above cross-referenced applications. The system includes a central processing unit (CPU), a memory bus controller (MBC), and a main storage unit (MSU). The central processing unit 1 includes the I-unit 4, the E-unit 5, and the S-unit 6. The instruction unit (I-unit) 4 fetches, decodes, and controls instructions and controls the central processing unit. The execution unit (E-unit) 5 provides computational facilities for the data processing system. The storage unit (S-unit) 6 controls the data processing machines instruction and operand storage and retrieval facilities.

Other major parts of the FIG. 1 system includes one or two input-output processors (IOP) 10,14 which receives and processes input-output requests from the central processing unit 1 and provides block multiplexer channels; the console 9 which communicates with the central processing unit 1 to provide system control and byte multiplexer channels; the memory bus controller (MBC) 2 which provides main memory and bus control, system wide coordination of functions and timing facilities; and the main storage unit (MSU) 3 which provides the system with large capacity memory.

The data processing system shown in FIG. 1 employs a dual bus structure including the A bus 16 and the B bus 17. The A bus carries data from the console, the input-output processor 10, and the central processing unit 1 to the memory bus controller 2. The B bus carries data from the memory bus controller 2 and the main storage unit 3 to the console 9, the input-output processor 10 and the central processing unit 1.

In FIG. 1, The Cache Storage Unit (S-Unit) 6 provides high speed cache (buffer) storage for instructions and operands. The S-Unit 6 receives and processes all requests for data (either instructions or operands) by the I-Unit 4. Virtual-to-system address translations are accomplished by the S-Unit, which also maintains the Translation Lookaside Buffer (TLB). Cache to mainstore data transfers necessary to honor I-Unit requests for data are initiated by the S-Unit.

The S-Unit 6 also provides the Bus interface between the I-Unit 4 and the E-Unit 5 portions of the CPU and the rest of the system.

Figure 2:
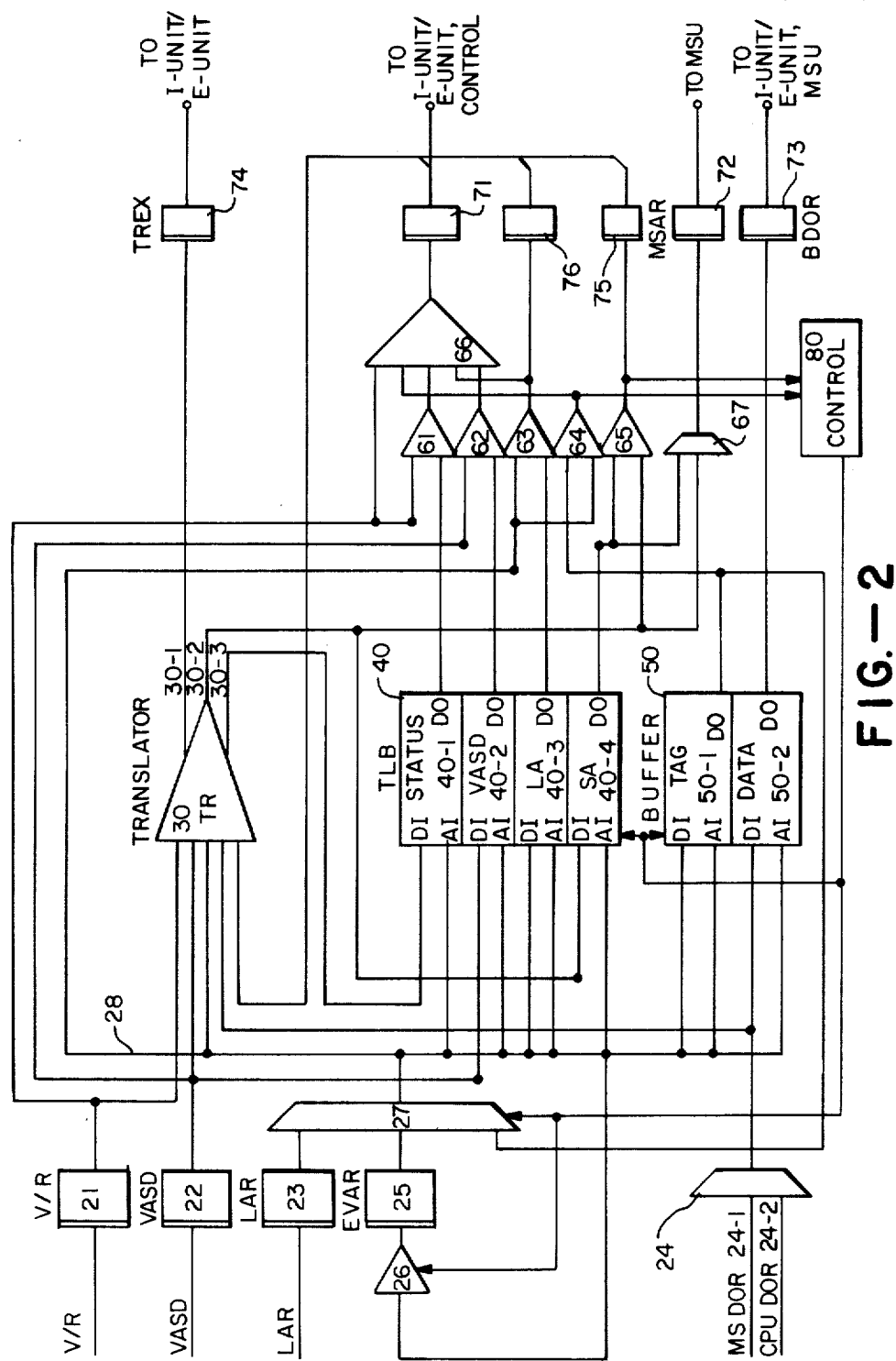
FIG. 2 depicts a block diagram of a virtual memory apparatus of the present invention and which forms part of the FIG. 1 system.

S-Unit Detail—FIG. 2

FIG. 2 shows a detailed block diagram of the S-unit of FIG. 1. The functional characteristics of each block in FIG. 2 are described as follows.

CPU Request Latches

Data requested by the CPU is identified by three fields which are latched and saved by the S-unit in the CPU request latches 21, 22, and 23.

The Virtual/Real (V/R) bit in a request field, saved in latch 21, signifies whether the requesting logical address is virtual or real.

The Virtual Address Space Descriptor (VASD), saved in latch 22, identifies the address space to be used to fetch data for a virtual address request. For a real address request, the VASD field is not significant.

The Logical Address (LA) field, saved in latch 23, identifies the logical address of the requested data. A logical address can be either a Virtual Address (VA) or a Real Address (RA). For a virtual address access, the LA field is a virtual address. For a real address access, the LA field is a real address.

Address Structure

Logical Address Bus (LAB) 28 is sourced from the LAR 23, the EVAR 25, or the TLB Pointer field from the Buffer Tag 50-1 via the multiplexor 27, as shown in table A. Note that when selecting the TLB Pointer field from the Buffer Tag 50-1, bits 1-12 are zero, bits 13-20 are sourced from the TLB pointer filed in the Buffer Tag 50-1, and bits 20-31 are sourced from the LAR. The Eviction Address Register (EVAR), latch 25, holds the eviction address used during an eviction. The EVAR is loaded from the Logical Address Bus (LAB) 28 via the incrementor 26, according to table B. Note that the EVAR is initially loaded from the LAB with bits 20-31 forced to zero. Note also that the incrementor 26 can increment the LAB address by hex 10 which allows the EVAR to access every buffer location while retaining the TLB index portion of the logical address.

Translation Lookasie Buffer

The Translation Lookaside Buffer (TLB), block 40, is a storage array of 256 entries which contains information to perform fast logical address to system address translations. The TLB is addressed by the logical address bits 12-19 from the LAB 28. Each TLB entry consists of the four fields described below.

The Status field, block 40-1 consists of a Virtual Address Valid subfield and a Real Address Valid subfield. The Virtual Address Valid Subfield indicates whether the entry may be used to perform a Virtual Address to System address translation. The Real Address Valid subfield indicates whether the entry may be used to perform a Real Address to System address translation. The TLB status field is sourced from the translator 30.

The TLB VASD field, block 40-2, saves the VASD used to make the TLB entry. It is only significant when used to translate a virtual address to a real address. The TLB VASD field is sourced from the VASD latch 22.

The TLB LA field, block 40-3, saves the Logical page, bits 1-19 of the LAB28, address used to make the TLB entry.

The TLB SA field, block 40-4, saves the system page address, bits 1-19 of the translator address bus 30-2, which corresponds to the logical address saved in the LA field, block 40-3, when the TLB entry is made.

Buffer

The buffer, block 50, is a storage array which provides fast data access. The buffer consists of 128 entries. Each buffer entry consists of a Tag field 50-1 and a Data field 50-2. The Buffer is addressed by logical address bits 20-26 from the LAB 28.

The Buffer data field, block 50-2, consists of storage for 32 bytes of mainstore data. Each buffer data access fetches eight contiguous bytes of data (mod 8) from the addressed entry. The initial byte is determined by logical address bits 27-31 from the LAB 28. The data field 50-2 is sourced from multiplexer 24 which selects data from mainstore resulting from a mainstore read access, or data from the CPU resulting from a CPU store instruction.

The Buffer Tag field, block 50-1, consists of a control subfield and an address subfield.

The tag address subfield consists of logical address bits 12-19 used to access the data block from mainstore. It is the address of the TLB entry used to source the mainstore address register 72 to fetch the data from mainstore. The tag address subfield is written when data from mainstore is written into the buffer. The tag address subfield is sourced from bits 12-19 of the LAB 28.

The tag control subfield indicates the state of the corresponding buffer data field. The following states are distinguished:
empty: The data field does not contain valid data
unmodified: The data field contains unmodified data
modified: The data field contains modified data The tag control subfield is initially set to the empty state. It is also set to the empty state whenever a data block is deleted from the buffer. The tag control subfield is set to the unmodified state when data from mainstore is written into the buffer. The tag control subfield is set to the modified state when the data is stored into by the CPU. A modified buffer entry must be stored to mainstore before the buffer entry can be reused for another mainstore data block.

Translator

The translator, block 30, contains the hardware necessary to transform CPU data access parameters in latches 21, 22, and 23 to system addresses required to access the data in mainstore via the MSAR, latch 72. The translator is invoked whenever the TLB does not contain a valid translation for a CPU data access. The translator performs the virtual-to-system or real-to-system address transformation and places the results in the TLB. The details of the translator and of the virtual-to-system or real-to-system address transformation employ well-known algorithms and apparatus.

The translator, block 30, receives as inputs the CPU data access parameters in latches 21, 22, and 23 via the LAB 28, the status of the current TLB entry from the status latches 71, 75 and 76, and mainstore resident translation table data via multiplexor 24.

The translator, block 30, produces three outputs described below. Translation exception status bus 30-1 identifies the cause of a translation failure if the translator is not able to successfully complete a translation. Translation address bus 30-2 provides the system address to access mainstore resident translation tables during a translation. Following a successful translation, the address bus contains the translated system address. Translation status bus 30-3 provides the TLB status to be written at the conclusion of a successful translation.

Match

The match function 61-66 compares the CPU data access parameters with the information stored in the TLB and TAG arrays to determine whether the requested translation is TLB resident and the requested data is buffer resident.

The TLB status match comparator 61 compares the request type (virtual or real) held in the V/R latch 21 with the contents of the accessed TLB status resident field in block 40-1. If the V/R latch 21 indicates real, and the Real Address Valid subfield from the TLB status field 40-1 indicates valid, then the TLB status match function 61 indicates a TLB status match. Similarly, the TLB status match function comparator 61 also indicates a TLB status match if the V/R latch 21 indicates virtual, and the Virtual Address Valid subfield from the TLB status field 40-1 indicates valid.

The TLB VASD match comparator 62 indicates a match if the CPU VASD field held in the VASD latch 22 matches the VASD field from the TLB VASD block 40-2.

The TLB LA match comparator 63 indicates a match if the CPU logical address (LA), bits 1-19 from the LAB 28, matches the corresponding logical address bits from the TLB LA block 40-3.

The tag match comparator 64 indicates a match if LAB 28 bits 12-19 match the contents of the tag address subfield of the accessed buffer tag 50-1 and if the tag control subfield 50-1 is not in the empty state.

The TR/TLB Address match comparator 65 indicates a match if the contents of the accessed TLB SA field 40-4 matches the corresponding field of the translation address bus 30-2.

The final match 66 produces three match results which are latched in the status latch 71.

TLB match status indicates that the requesting address has a valid TLB-resident translation. TLB match status is indicated for a real address access if the match functions 61 and 63 both indicate match: that is, the accessed TLB entry is valid for real address translations and the contents of the TLB LA field 40-3 matches the corresponding field of the requesting real address. TLB match status is indicated for a virtual address access if the match functions 61, 62 and 63 all indicate match: that is, the accessed TLB entry is valid for virtual address translations, the CPU VASD in latch 22 matches the contents of the TLB VASD field 40-2, and the contents of the TLB LA field 40-3 matches the corresponding field of the requesting virtual address.

Tag match status indicates that the requested data is buffer-resident. Tag match status is indicated if the requirements for TLB match status are met and if the tag match function 64 indicates a match.

Result Latches

The translation exception status latch 74 saves the translation exception status resulting from the translator 30.

The match status latch 71 saves the match status from the final match comparator 66.

The TR/TLB match status latch 75 saves the results of the TR/TLB Address match function comparator 65.

The mainstore address register (MSAR) latch 72 holds the system address required for a mainstore data access. The MSAR 72 is sourced from one of two sources via the MSAR multiplexor 67. The translator 30 specifies mainstore data addresses via the translation address bus 30-2. A CPU data access specifies a mainstore data address via the TLB SA field from block

40-4. The mainstore data address required to store a modified buffer data block back to mainstore is also sourced from the TLB SA field, block 40-4.

The Buffer Data Out Register (BDOR) latch 73 holds data accessed from the Buffer data field block 50-2, for presentation to the CPU and to mainstore.

DETAILED OPERATION

The detailed operation of the preferred embodiment of the present invention is related below.

FIG. 2 provides a schematic diagram showing the address and data paths of the present invention. The present invention is primarily concerned with improving the efficiency of the translation buffer. The TR/TLB status match function 65 recognizes when the translator block 30 is to replace a TLB entry whose system address field 40-4 matches the system address of the new TLB entry on line 30-2. When the TR/TLB address match function 65 indicates such a match, the control function block 80 can allow the new translation information to replace the old translation information in the TLB 40 without purging the buffer 50 of all buffer resident lines belonging to the old TLB entry.

The CPU requests a data access by setting a virtual/real bit into the virtual/real latch 21, by setting the virtual address space descriptor into the VASD latch 22, and by setting the logical address into the LAR 23. The address in the LAR 23 is selected to the LAB 28 and is used to access an entry in the TLB 40 and in the buffer 50. The accessed TLB entry fields are compared to the CPU request parameters held in latches 21, 22 and 23 by comparators 61, 62 and 63 respectively. The final TLB match function 66 resolves TLB match and places the results in the TLB status register 71 according to table D.

The significant case for the present invention is when at least one of the comparators 61, 62 or 63 indicate a mismatch and therefore the match status latch 71 will indicate TLB mismatch. The translator block 30, initiates a translation upon recognizing the TLB mismatch status in the match status latch 71. The translator 30 translates the CPU requesting parameters held in latches 21, 22 and 23 to a system address which can be used to access the requested data in mainstore. The details of the translation are unimportant to the present invention and may consist, for example, of the well known IBM translation algorithm which uses mainstore resident translation tables to derive a system address. The translator 30 can access the mainstore resident translation tables by selecting the address of the desired translation table entry to line 30-2, through the multiplexor 67, and into the MSAR 72. The address in the MSAR 72 is used to access mainstore data which is returned from mainstore via the MSDOR line 24-1 through the multiplexer 24 to the translator 30.

If the translation cannot successfully complete, the translation exception status is placed in the translation exception latch 74 and the request is complete. If the translation does complete successfully, the translated system address is placed on the line 30-2. In addition, the appropriate valid bit is set on line 30-3: virtual valid is set if the virtual/real bit 21 indicates virtual; the real valid bit is set if the virtual/real bit 21 indicates real.

The TR/TLB page address comparator 65 compares the translated system page address on line 30-2 with the TLB corresponding system address field 40-4 from the accessed TLB entry. If the TR/TLB address match function 65 indicates a match, then control 80 allows the new translation to replace the old translation in the TLB 40. When the new translation is entered into the TLB, either the virtual valid or the real valid bit is set in the TLB status field 40-1, the VASD in latch 22 is written into the VASD field 40-2, logical address bits 1-19 in latch 23 are selected through multiplexor 27 to the LAB 28 and written to the LA field 40-3, and the translated system address bits 1-19 on line 30-2 are written into the SA field 40-4. There is no need to purge the buffer 50 of any data lines fetched from mainstore with the old TLB entry, since both the old and the new TLB entry access exactly the same page frame in mainstore.

If the TR/TLB status match function 65 had indicated a system address mismatch, then control 80 would initiate an eviction as described below. The EVAR 25 is initialized as shown in Table B. Address bits 12-19 are sourced from the LAB 28 and the remaining bits are set to zero. The EVAR is then selected through multiplexer 27 to the LAB 28 and is used to access an entry in the TLB 40 and an entry in the buffer 50. The accessed buffer tag entry 50-1 is compared to bits 12 through 19 of the LAB 28 in comparator 64 to determine if the buffer resident line belongs to the TLB entry about to be displaced. If comparator 64 indicates a match and an unmodified buffer data state, then control 80 sets the accessed buffer tag subfield 50-1 state to empty. If the comparator 64 indicates a match and a modified buffer data state, then control 80 initiates a move out of the data to main store by selecting the accessed TLB SA field 40-4 through multiplexer 67 to the MSAR 72, bits 1-19, and selecting bits 20-31 from the LAB 28. The accessed buffer data field 50-2 is selected to the BDOR latch 73. The data in the BDOR latch 73 is written to mainstore at the address in the MSAR 72. After the data has been written in mainstore, control 80 writes the accessed buffer tag field 50-1 to the empty state. If comparator 64 indicates no match, or after control 80 has written the buffer tag field 50-1 to the empty state, then the address in the EVAR 25 is incremented by selecting the LAB 28 through the incrementor 26. Each buffer entry is examined in turn and if it matches as described above, it is released from the buffer. After all buffer entries have been processed, no buffer entries belonging to the accessed TLB entry remain in the buffer. Control 80 then allows the translator 30 to replace the old translation in the TLB with the new translation by writing each of the TLB fields as described above.

By adhering to the above algorithm the control block 80 guarantees that there will never be data in the buffer belonging to a displaced TLB entry unless both the new and the old TLB entry translate to the same system page address.

For completeness, we describe both the move in and the move out processes whereby data is moved from mainstore to the buffer and from the buffer to mainstore. Once a CPU data request has a matching TLB entry as described above, comparator 64 determines whether there is a resident buffer data line which belongs to the match TLB entry. If comparator 64 indicates a match and TLB match is also indicated, comparator 66 sets tag match status into the match status latch 71. The accessed data from the buffer data field 50-2 is latched into the BDOR latch 73 for presentation to the CPU and the request is complete.

If the comparator 64 indicates a mismatch and a modified data status, then control 80 initiates a move out by selecting the accessed buffer tag field 50-1 through multiplexer 27 to the LAB 28 as indicated in Table A. The accessed buffer tag field 50-1 is selected to bits 12 through 19 of the LAB 28 to access the TLB entry which was used to fetch the data from mainstore. The accessed TLB system address field 40-4 is selected through multiplexer 67 to the MSAR 72, bits 1-19, for presentation to mainstore. Meanwhile, logical address bits 20-31 from the LAR 23 are selected through multiplexer 27 to the LAB and access the buffer data field 50-2 which is loaded into the BDOR latch 73 to be written to mainstore. After the data has been written to mainstore, control 80 selects the entire LAR 23 through multiplexer 27 to the LAB 28 and writes the accessed buffer tag field 50-1 to the empty state.

If the comparator 64 indicates tag on unmodified line state, then control 80 writes the accessed buffer tag field 50-1 state to empty thus deleting the line from the buffer.

If the comparator 64 indicates an invalid line state, or after the line has been moved out to mainstore, or deleted from the buffer, then the accessed TLB system address field 40-4 is selected through the multiplexor 67 to the MSAR 72 to access the requested data. Mainstore returns the requested data via the MSDOR line 24-1 through multiplexer 24 where it is written into the buffer data field 50-2. When the data is written to the buffer data field 50-2 the buffer tag control subfield 50-1 is written to the unmodified state and the value of the LAB 28 bits 12 through 19 is written in the buffer tag address subfield 50-1. At this point, comparator 64 will indicate a match between the buffer tag subfield 50-1 and the logical address on the LAB 28. The final match function 66 will post a tag match status into the match status latches 71, and the accessed buffer data field 50-2 will be latched into the BDOR latches 73, completing the request.

Thus, it can be seen that the present invention avoids the overhead associated with the eviction process when a new TLB entry is made whose system address matches the system address field 40-4 of the TLB entry it is replacing.

TABLE A

| | Multiplexor 27 Function Table | | |
| --- | --- | --- | --- |
| | | LAB SOURCE | |
| Function | bits 1-11 | bits 12-19 | bits 20-31 |
| LAR | LAR | LAR | LAR |
| EVAR | EVAR | EVAR | EVAR |
| TAG | 0 | TAG | LAR |

TABLE B

| | Incrementer 26 Function Table | | |
| --- | --- | --- | --- |
| | | EVAR SOURCE | |
| Function | bits 1-11 | bits 12-19 | bits 20-31 |
| initial bad | 0 | LAB | 0 |
| increment | 0 | LAB | LAB + 32 |

TABLE C

| TLB Status Match Function - 61 | | | |
| --- | --- | --- | --- |
| TLB STATUS | | MATCH FUNCTION | |
| R Valid | V Valid | Real Access | Virtual Access |
| 0 | 0 | 0 | 0 |
| 0 | 1 | 0 | 1 |
| 1 | 0 | 1 | 0 |
| 1 | 1 | 1 | 1 |

TABLE D

| TLB Final Match Function 66 | | | | |
| --- | --- | --- | --- | --- |
| TLB COMPARATOR RESULT | | | Access Type | |
| Status Match 61 | VASD Match 62 | LA Match 63 | Real | Virtual |
| 0 | 0 | 0 | 0 | 0 |
| 0 | 0 | 1 | 0 | 0 |
| 0 | 1 | 0 | 0 | 0 |
| 0 | 1 | 1 | 0 | 0 |
| 1 | 0 | 0 | 0 | 0 |
| 1 | 0 | 1 | 1 | 0 |
| 1 | 1 | 0 | 0 | 0 |
| 1 | 1 | 1 | 1 | 1 |

1 = Match
0 = Mismatch

While the invention has been particularly shown and described with reference to preferred embodiments thereof, it will be understood by those skilled in the art that the foregoing and other changes in form and detail may be made therein without departing from the spirit and scope of the invention.

What is claimed is:

1. A memory apparatus adapted for use with a data processing machine generating logical addresses, a logical address including a first field and a second field, to identify requested lines of data, comprising:

main store means for storing data at main store locations addressed by system addresses, a system address including a system page address portion identifying a page of a plurality of lines of data in the main store means;

register means, adapted for communication with the data processing machine to receieve a requesting logical address, for storing the requesting logical address;

translation buffer means, in communication with the register means, for storing translation information at a translation buffer location addressed by the first field of the requesting logical address, the translation information identifying a unique system page address corresponding to a logical address;

cache means, in communication with the register means and the main store means, for storing at a cache location addressed by the second field of the requesting logical address a version of a line of data from the main store means and a means for associating the line of data with a unique system page address;

first means, in communication with the register means and the translation buffer, for matching the translation information stored in the translation buffer location with the requesting logical address to generate a no translation buffer match signal when the requesting logical address and the translation information do not match;

translator means, in communciation with the register means and the first means for matching, for generating translation information identifying a unique system page address corresponding to the requesting logical address in response to the no translation buffer match signal;

second means, in communication with the translator means and the translation buffer means, for matching the system page address identified by the translation information generated by the translator means with the system page address identified by the translation information stored in the translation buffer location to generate a no system address match signal when the identified system page addresses do not match;

eviction means, in communication with the second means for matching, the cache means and the translation buffer means, for evicting lines of data from the cache means that are associated with the system page address identified by the translation information stored at the translation buffer location in response to the no system address match signal.

2. The apparatus of claim 1, further including:
means, in communication with the eviction means, the translator means and the translation buffer means, for replacing the translation information stored at the translation buffer location with the translation information generated by the translator means.

3. The apparatus of claim 1, wherein the means for associating the line of data at the cache location with a unique page system address includes a translation buffer pointer identifying a translation buffer location in the translation buffer means storing translation information for the line of data.

4. The apparatus of claim 1, wherein the first field and the second field of the logical address include at least one address bit in common.

5. The apparatus of claim 1, further including:
means, in communication with the cache means, the main store means and the eviction means, for transferring the lines of data evicted from the cache means to the main store means.

6. The apparatus of claim 3, wherein the translation buffer pointer includes at least a portion of the first field of the requesting logical address.

7. The apparatus of claim 6, wherein the eviction means includes:
eviction register means, in communication with the register means, for storing the first field of the requesting logical address;
means for comparing the first field of the requesting logical address with the pointer stored at individual cache locations to indicate when the pointer and the first field match; and
means, responsive to a match at a given cache location, to evict the data stored at the buffer location.

8. The apparatus of claim 7, wherein the eviction register means includes:
an address register storing an address for accessing the cache means including the first field of the requesting logical address and a field for accessing the cache means; and
means for incrementing the field for accessing the cache means to successively generate an address for each cache location addressable by a requesting logical address having the first field stored in th address register.

* * * * *